Dec. 3, 1929.   V. G. APPLE   1,738,166
METHOD OF MAKING ARMATURES
Original Filed Nov. 18, 1927   5 Sheets-Sheet 1
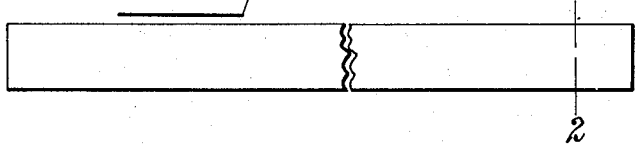
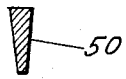
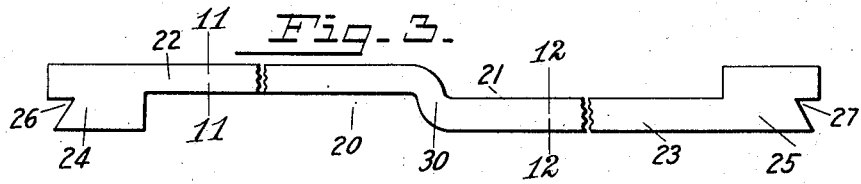
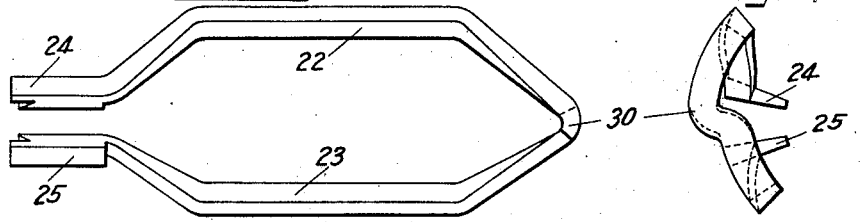
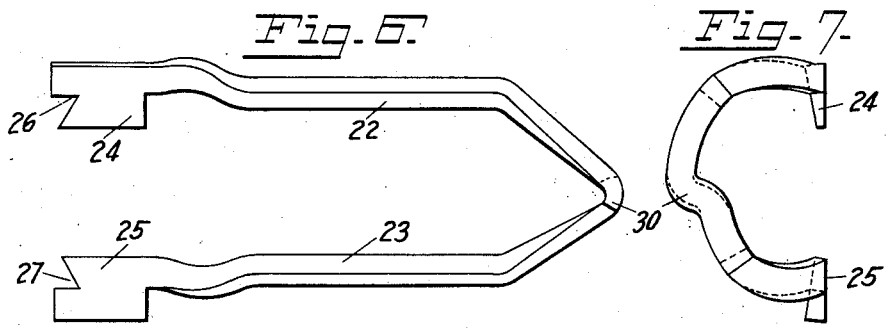
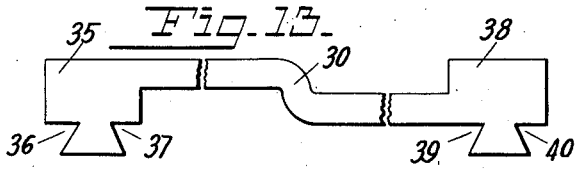
INVENTOR.
Vincent G. Apple Dec. 3, 1929.   V. G. APPLE   1,738,166
METHOD OF MAKING ARMATURES
Original Filed Nov. 18, 1927   5 Sheets-Sheet 2
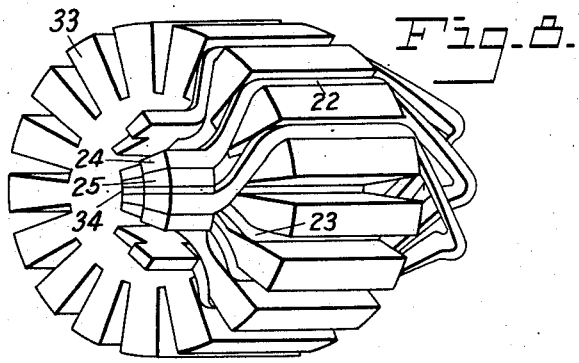
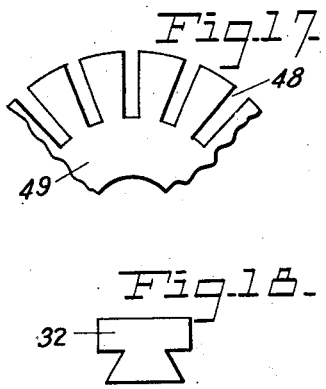
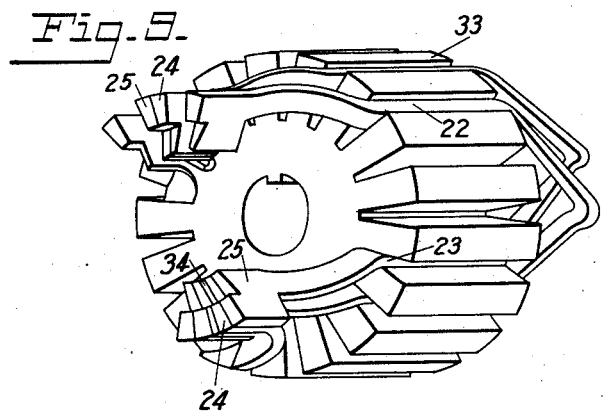
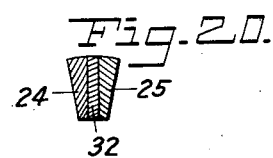
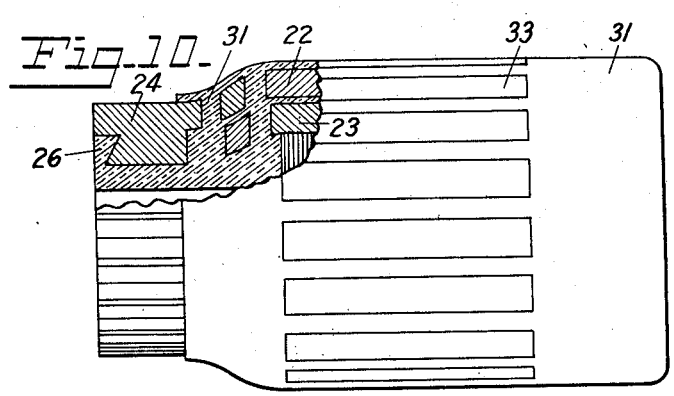
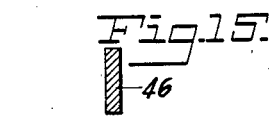
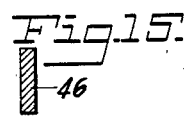
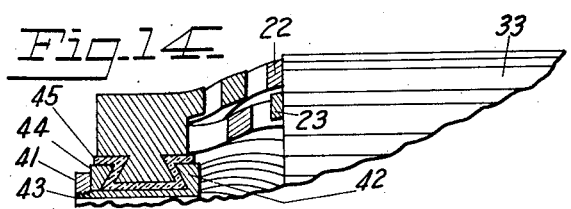
INVENTOR.
Vincent G. Apple

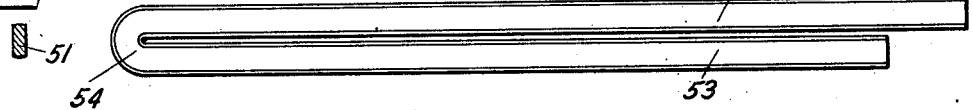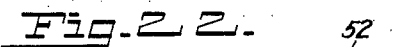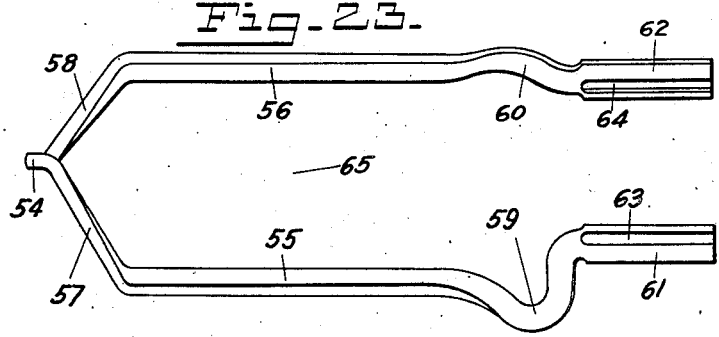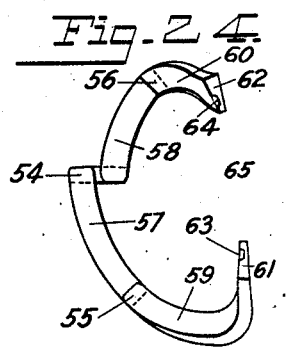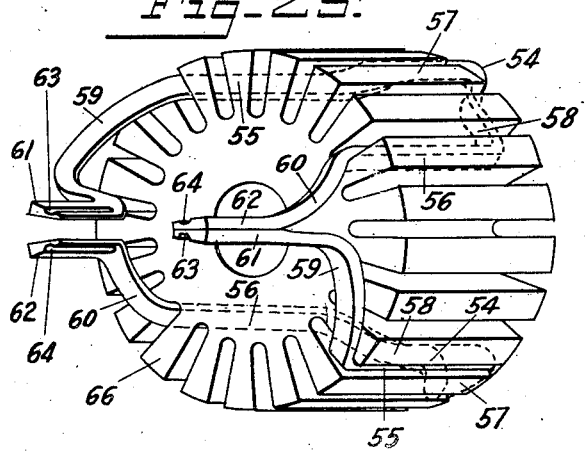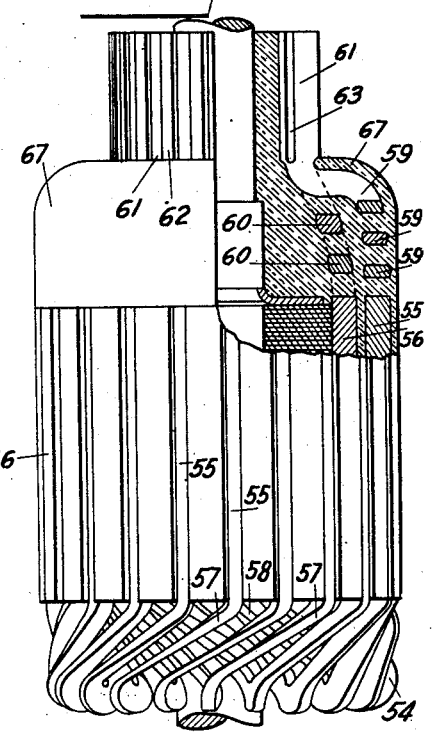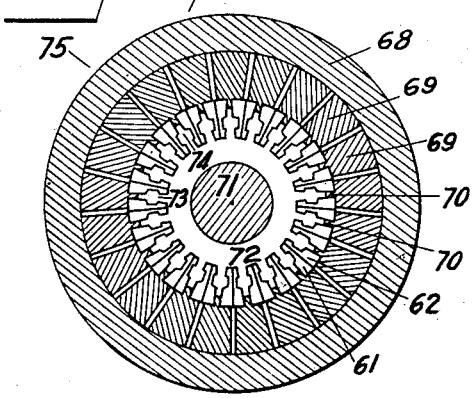

Dec. 3, 1929.                V. G. APPLE                 1,738,166
                         METHOD OF MAKING ARMATURES
                    Original Filed Nov. 18, 1927   5 Sheets-Sheet 4
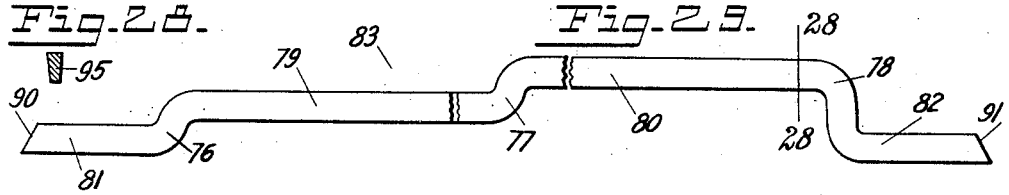
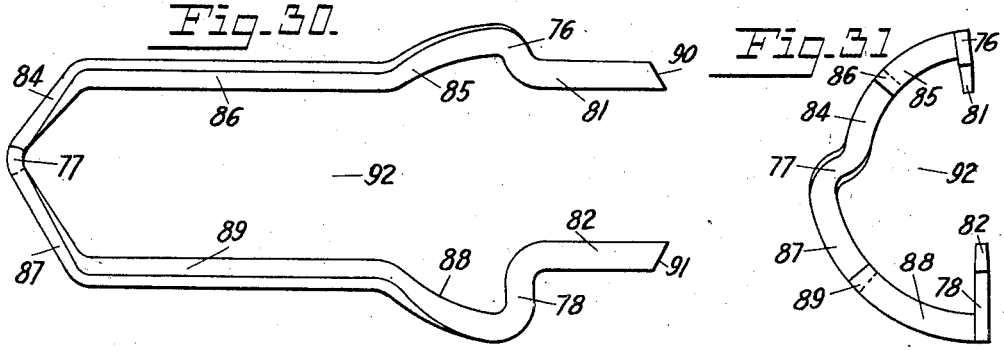
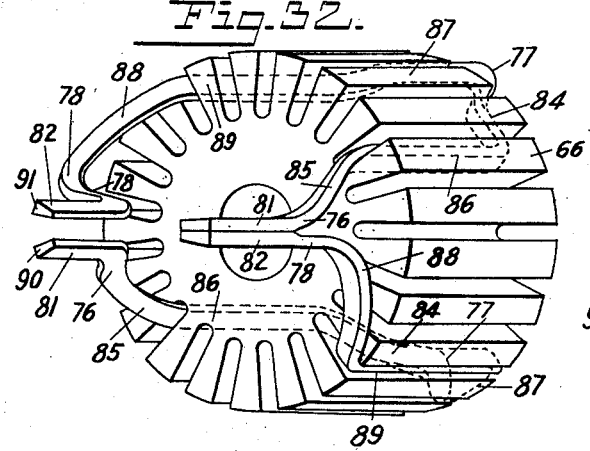
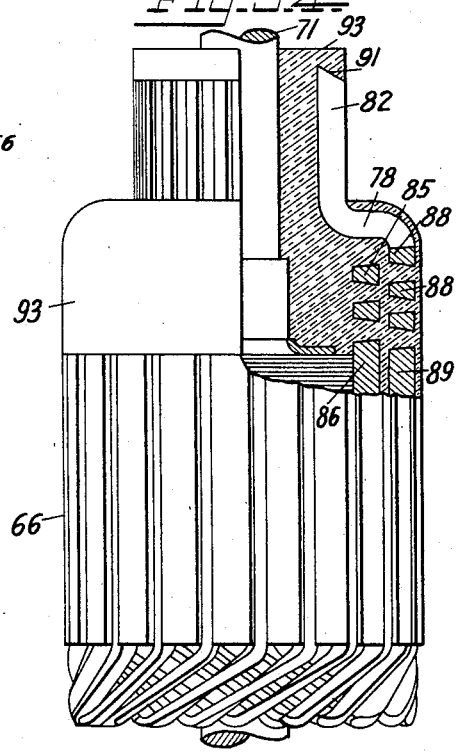
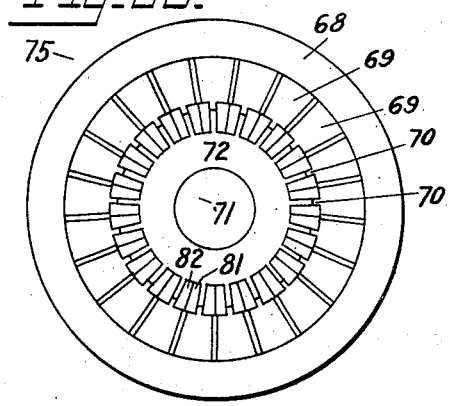
INVENTOR
Vincent G. Apple Dec. 3, 1929. V. G. APPLE 1,738,166
METHOD OF MAKING ARMATURES
Original Filed Nov. 18, 1927 5 Sheets-Sheet 5
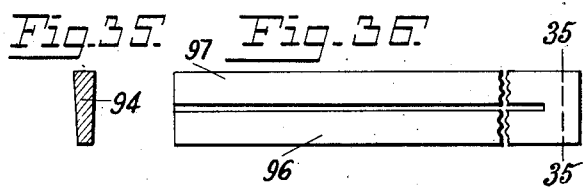
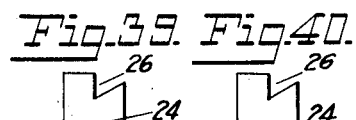
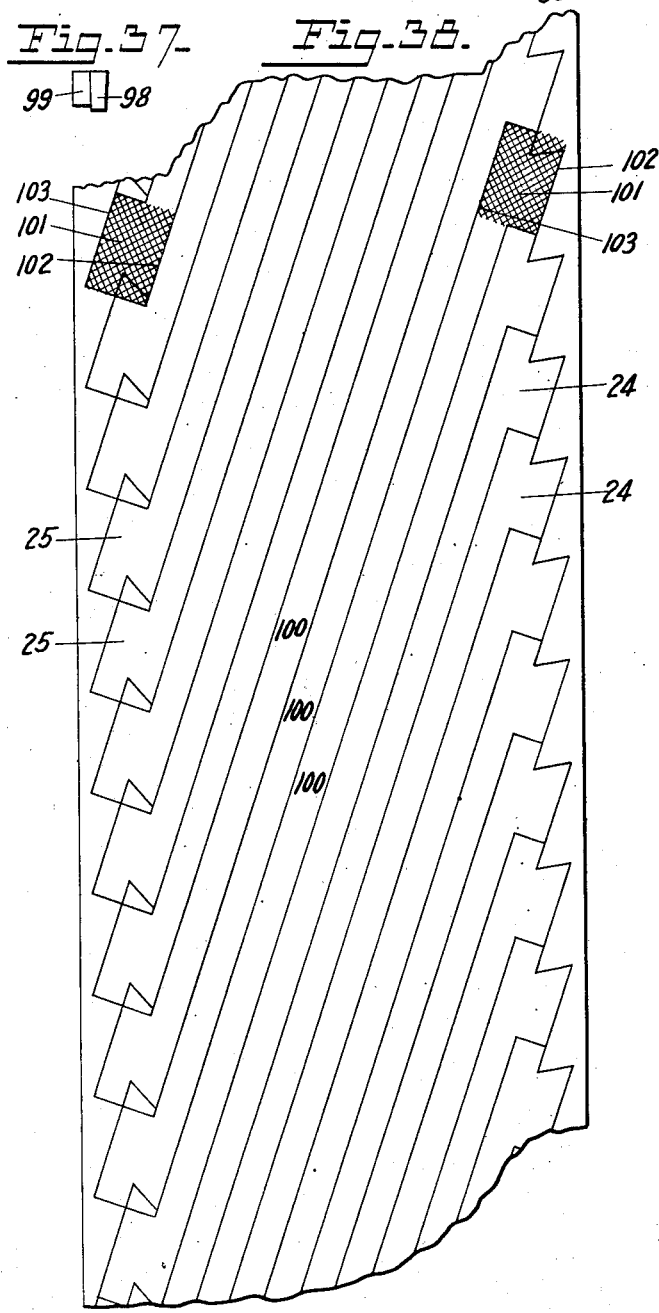
INVENTOR.

Patented Dec. 3, 1929

1,738,166

UNITED STATES PATENT OFFICE

VINCENT G. APPLE, OF DAYTON, OHIO

METHOD OF MAKING ARMATURES

Original application filed November 18, 1927, Serial No. 234,158. Divided and this application filed October 26, 1928. Serial No. 315,342.

This invention is shown, tho not claimed in my co-pending application Serial No. 234,158 of which this application is a division and relates to bar wound armatures having commutators, and comprises a winding composed of loops suitable for radial entry into open core slots, the open ends of said loops being somewhat prolonged and specially formed so that the commutator segments are composed of pairs thereof.

An object of my invention is to reduce the cost of an armature by eliminating the separately made commutator, thereby reducing the number of parts and the amount of labor and material required.

Another object is to improve the electric circuit thru an armature by eliminating the soldered, brazed or welded joints commonly made to connect the bars of the winding to the commutator segments.

Further objects will be apparent from a consideration of the following description, reference being had to the drawings wherein—

Fig. 1 shows a length of wedge shaped bar stock.

Fig. 2 is a cross section taken at 2—2 Fig. 1.

Fig. 3 shows the bar Fig. 1 with portions cut away.

Fig. 4 shows a bar Fig. 3 after it has been bent to form one loop of a lap winding.

Fig. 5 is an end view of Fig. 4.

Fig. 6 shows a bar Fig. 3 after it has been bent to form one loop of a wave winding.

Fig. 7 is an end view of Fig. 6.

Fig. 8 shows several loops of a lap winding assembled in a core.

Fig. 9 shows several loops of a wave winding assembled in a core.

Fig. 10 shows a completed armature, partly in section.

Fig. 11 is a cross section taken at 11—11 Fig. 2.

Fig. 12 is a cross section taken at 12—12 Fig. 2.

Fig. 13 shows how commutator lugs are formed when a conventional commutator binding means is employed.

Fig. 14 shows a conventional commutator binding means applied to loops made according to my invention.

Fig. 15 is a cross section of rectangular bar stock which I may employ.

Fig. 16 is a cross section thru either of the conductor bars resulting when rectangular stock Fig. 15 is used and cut away as in Fig. 3.

Fig. 17 is a fragmentary end view of a core having rectangular winding slots.

Fig. 18 is an outline of a pad which may be used to increase the thickness of a commutator segment.

Fig. 19 shows how commutator lugs of rectangular cross section may be combined with a pad to make a relatively thick commutator segment.

Fig. 20 shows how commutator lugs of wedge shaped cross section may be combined with a pad to make a relatively thick wedge shaped commutator segment.

Fig. 21 is a cross section thru wire from which my winding units may be made.

Fig. 22 shows a length of wire Fig. 21 bent back upon itself to hairpin form.

Fig. 23 is a plan view of a complete loop made from wire Fig. 21.

Fig. 24 is an end view of Fig. 23.

Fig. 25 shows two loops placed in a core.

Fig. 26 shows a completed armature, partly in section, wound with wire loops Figs. 23 and 24.

Fig. 27 is a cross section taken thru a mold immediately above the ends of the commutator lugs.

Fig. 28 is a cross section thru another form of wire from which loops may be made.

Fig. 29 shows a step in the method of forming wire Fig. 28 into a loop.

Fig. 30 is a plan view of a loop formed from wire Fig. 28.

Fig. 31 is an end view of a loop formed from wire Fig. 28.

Fig. 32 shows two loops Fig. 30 in a core.

Fig. 33 is a top view of a mold used to bind the ends of loops Fig. 30 together.

Fig. 34 shows a complete armature wherein loops Fig. 30 have been used.

Fig. 35 is a cross section thru a bar of stock which is but slightly wedge shaped.

Fig. 36 shows the manner in which a bar Fig. 35 may be split lengthwise.

Fig. 37 shows how the ends of bars shown in Fig. 36 may be paired.

Fig. 38 shows how winding units may be economically cut from sheet stock.

Fig. 39 is a winding unit as it appears when cut as in Fig. 38.

Fig. 40 shows how units Fig. 39 are offset.

Similar numerals refer to similar parts thruout the several views.

Heretofore bar wound armatures of the open slot type have usually been made by providing loops of bar stock or wire and radially entering these loops into the open core slots, then providing a separate commutator and joining the open ends of the loops to bars of the commutator by soldering. The volume of current carried by these bar windings is usually large and frequently the solder is melted and the usefulness of the armature destroyed. This, together with the fact that the cost of separately producing a conventional commutator is considerable, and the labor incident to joining the loop ends to the commutator bars is costly, makes the hereinafter described method of great value both as to cost and dependability.

A segment of a commutator is preferably wedge shaped, and since the present invention contemplates forming a commutator segment and a turn of the winding integral, a simple way to put the invention to practice is to use a core having wedge shaped winding slots. In this way stock of suitable cross section to fit a winding slot may be suitable also for a commutator segment. As one means to thus carry out my invention I provide lengths of bar stock Fig. 1 of a cross section Fig. 2, then cut away portions 20 and 21 and cut notches 26 and 27 Fig. 3, leaving a conductor bar 22 adapted to occupy a position in the outer layer of the winding, a conductor bar 23 adapted to occupy a position in the inner layer of the winding connected as at 30, and two lugs 24 and 25 each suitable to compose half the thickness of a commutator segment.

Segments of conventional commutators are frequently composed of several circumferentially adjacent layers, so also in the present invention a lug 24 and a lug 25 are placed circumferentially adjacent in electrical contact and held by a commutator segment binding means which impinges on notches 26 and 27. A cross section thru outer conductor bar 22 is shown at 28 Fig. 11 and a cross section thru inner conductor bar 23 is shown at 29 Fig. 12. The cross sectional areas of Fig. 11 and Fig. 12 are substantially equal.

After lengths of stock have been cut away and notched as shown in Fig. 3 they are bent to compose loops. If a lap winding is desired they are bent as in Fig. 4 and end view Fig. 5, while if a wave winding is desired they are bent as in Fig. 6 and end view Fig. 7.

Fig. 8 shows several loops of a lap winding in place in a core 33 while Fig. 9 shows several loops of a wave winding in place in another core 33. The purpose of these figures is to show how a continuous circuit may be provided by placing a commutator lug 24 circumferentially adjacent to a commutator lug 25, two such lugs in electrical contact joining adjacent loops of the circuit and together composing one commutator segment. Other requirements of common practice must be met, such as having the core slots lined with insulating material, keeping the outer and inner layers of the winding electrically separated, etc.

When a number of loops equal to the number of slots have been assembled in a core, pairs of commutator lugs must be held in intimate electrical contact, one member of a pair with the other, to compose commutator segments, and the segments must be mechanically bound together, tho electrically separated from each other, to compose a commutator.

Spacers 34 of insulating material may be inserted to separate the several segments but must not be placed between the two lugs which together compose a segment. Spacers 34 may, however, be eliminated in a manner hereinafter described relative to Fig. 27.

A preferred binding means is shown in Fig. 10 where molded insulating material 31 surrounds the conductor bars and impinges on the notches 26 and 27 to bind the commutator segments together. Any suitable insulating material may be used, as may any suitable mold, a requirement being that the commutator lugs may be subjected to inward radial pressure, or that they may be otherwise held to keep them in intimate contact while molding is taking place, and while the drawing shows the entire winding covered with insulating material, an economy may be effected by so arranging the mold as to permit insulating material to surround the commutator end of the armature only, and when the armature is to run at relatively low speed such modification may be justifiable.

Instead of using molded insulation as a binding means, the conventional commutator binding means may be employed. By cutting and notching a length of stock as in Fig. 13, instead of as in Fig. 3, a conventional commutator binding means shown in Fig. 14 may be used. In Fig. 13 the lug 35 is notched as at 36 and 37 and the lug 38 is notched as at 39 and 40. In Fig. 14 a nut 41 draws together the beveled head 42 of sleeve 43 and the beveled washer 44 against insulation 45, after the manner practiced in building ordinary commutators.

In the foregoing my improved bar winding has been described as it applies to cores having wedge shaped winding slots, but a winding applicable to slots of other cross section may profitably embody my improvements. For instance, if bar Fig. 1 were of a cross section as at 46 Fig. 15, it could be cut away and notched as in Fig. 3 and bent as in Figs. 4 and 5, or as in Figs. 6 and 7, or an outline as shown in Fig. 3 could be punched directly from flat sheet stock.

The conductor bars 21 and 22 would then be of rectangular cross section as at 47 Fig. 16 and could readily be assembled in a core 49 having rectangular slots as at 48 Fig. 17, but in such a case the lugs 24 and 25 should preferably be changed from their rectangular cross section 46 Fig. 15 to a wedge shaped cross section as at 50 Fig. 2. This could readily be accomplished by striking the lugs flatwise in a die, after which the winding could be assembled with core 49 and bound together as described relative to Figs. 8, 9 and 10.

Where an increased diameter of the commutator is not objectionable, a winding made of rectangular stock 46 Fig. 15, or one made from punchings taken from flat sheet stock, may be employed in slots 48 Fig. 17 without striking the lugs 24 and 25 flatwise in a die to provide the wedge shape. This may be done by providing a pad of outline 32 Fig. 18 and of wedge shaped cross section, and placing it between rectangular lugs 24 and 25 as shown in Fig. 19 which provides for each loop a wedge shaped commutator segment of somewhat increased thickness. This method of padding may also be used to produce a commutator of increased diameter when wedge shaped bar stock and wedge shaped core slots are used, by adding a pad of uniform thickness, and of an outline 32 Fig. 18, to the wedge shaped lugs 24 and 25 Fig. 20, thus providing a thicker segment. In fact a bar Fig. 1 may be of any cross section within reason, to fit corresponding core slots, if pads are added to the commutator lugs that will supply the difference between the natural cross section of a pair of lugs and the desired commutator segment.

The method of making a unit of my improved winding as disclosed in the foregoing description provided commutator segments of considerable radial depth, so that a commutator so made will admit of the considerable reduction in diameter incident to wear and truing up, giving long life to the armature. But there is a class of armatures such as are used in starting motors of automotive engines and the like, which not being called on for continuous service, are subject to little wear, and in such armatures, commutator segments of less radial depth may be employed. In the following description, which relates to Figs. 21 to 27 inclusive, I disclose one method of procedure in applying my improvements to economically produce such armatures.

Wire of a cross section 51 Fig. 21 is preferably made by passing a round wire of standard gauge between rollers, but it may be drawn directly to the shape shown. This wire is cut to suitable lengths and each length is bent double to hairpin form as shown in Fig. 22, providing a conductor bar 52, which later becomes a part of the outer layer of the winding, and a conductor bar 53, which later becomes a part of the inner layer of the winding, left joined together at 54. The hairpins are next spread to loop form, and Fig. 23 shows such a loop when bent for a wave winding, tho it is obvious that a loop for a lap winding is as readily produced from a like hairpin. The loop 65 Figs. 23 and 24 comprises an outer layer conductor bar 55, an inner layer conductor bar 56 joined at 54 by back lead portions 57 and 58, and front lead portions 59 and 60 terminating in commutator lugs 61 and 62.

Lugs 61 and 62 are produced by striking the free ends of the loop in a die and are not necessarily of greater cross sectional area than the wire Fig. 21, tho they may be stoved slightly endwise in the die to increase their cross sectional area. The lugs, however, are of somewhat greater radial depth than the bars. Grooves 63 and 64 are pressed lengthwise in the sides of lugs 61 and 62 respectively, to help increase the radial depth of the lugs, and to provide ledges whereon the commutator binding means may bear.

Fig. 25 shows two loops 65 laid in the slots of a core 66, and the manner in which one pair of lugs 61 and 62 here come together to continue the circuit and form one commutator segment is typical of the entire winding.

When an entire set of loops 65 have been entered into the slots of core 66, the structure is placed in mold 75 where insulating material 67 may be molded between and around front lead portions 59 and 60 and between segments composed of pairs of lugs 61 and 62, into grooves 63 and 64 to bind the structure together.

Fig. 27 shows a cross section taken thru mold 75 immediately above the ends of the commutator segment. The mold consists, in part of a ring 68 which is forced over jaws 69, each jaw having a small spacing tang 70 extending between segments composed of pairs of lugs 61 and 62. The radial inward pressure of jaws 69 holds the flat sides of a pair of lugs 61 and 62 in electrical contact and holds the pairs of lugs spaced apart so that insulation may be molded to surround shaft 71 filling space 72, and to extend thru openings 73 into pockets 74 to bind the lugs together to form a commutator.

Still another method of procedure to provide a commutator from circumferentially adjacent ends of conductor bars, where no great amount of wear is anticipated, is shown and described relative to Figs. 28 to 34 inclusive, where a length of wire 83 of cross section 95 Fig. 28 is offset as at 76, 77 and 78 Fig. 29 forming a leg 79 which later becomes a conductor bar of the inner layer of the winding, a leg 80 which later becomes a conductor bar of the outer layer of the winding and two lugs 81 and 82 which later become layers of the cylindrical ring which forms the commutator. Lugs 81 and 82 are in alignment in Fig. 29.

The bar 83 is next bent to form loop 92 shown in plan view Fig. 30 and end view Fig. 31, where a portion of leg 79 Fig. 29 forms back lead 84 and a portion forms front lead 85, the remainder forming inner layer conductor bar 86, and where a portion of leg 80 Fig. 29 forms back lead 87 and a portion forms front lead 88, the remainder forming outer layer conductor bar 89. Lugs 81 and 82 are beveled as at 90 and 91 respectively for reasons hereinafter disclosed.

Fig. 32 shows two loops 92 laid in the slots of a core 66, two lugs 81 and 82 being circumferentially adjacent to form one commutator segment and to join the two loops shown in continuous circuit. The entire winding is assembled in the same manner.

After an entire winding is placed in the slots of core 66 the core and winding are together placed in mold 75, a top view of which is shown in Fig. 33 with the armature in place, where insulation may be molded about shaft 71 to fill space 72 and extend outwardly between the commutator segments as far as tangs 70 of jaws 69 will permit.

Each commutator segment comprises a lug 81 and 82 circumferentially adjacent and in electrical contact. A completed armature is shown in Fig. 34 where insulation 93 extends between and about front leads 85 and 88, between shaft 71 and lugs 81 and 82 and around beveled ends 90 and 91 of said lugs to bind the whole together to compose a commutator.

As previously mentioned, loops shown in Figs. 1 to 7 inclusive are applicable when commutator segments of great radial depth are desired, and loops shown in Figs. 22, 23 and 24 when less radial depth is permissible. Loops shown in Figs. 29, 30 and 31 are likewise applicable where no great depth of commutator segment is required, but the latter loops are particularly suitable when the core contains a large number of apertures and the commutator therefore a large number of segments, since the greater the number of winding apertures, the deeper and thinner the conductor bars become, and the more nearly rectangular is the cross section of the bar, making it suitable to be placed one bar above another in the same winding aperture with minimum waste of space therein.

A loop may be economically provided for an armature having a large number of bars, and consequently having commutator segments which are nearly rectangular in cross section by splitting a bar of cross section 94 Fig. 35 lengthwise as in Fig. 36 to provide legs 96 and 97 of substantially equal cross sectional area, tho the bar 96 is slightly thinner and wider than the bar 97. The hairpin thus formed may be bent in the form of a loop similar to loop 65 Figs. 23 and 24, and the ends paired as at 98 and 99 Fig. 37, to form a commutator segment of each pair. This loop may be used to best advantage in a core having slots which are slightly wedge shaped.

A loop having commutator segments which are of nearly rectangular cross section and conductor bars which are of rectangular cross section, to be used in rectangular winding apertures, may readily be produced by punching parts 100 (see Fig. 39) from strips of flat sheet stock, one part immediately following the other with substantially no waste as shown in Fig. 38. At each stroke of the punch press spots 101 shown shaded in the sheet, may be struck, an edge 102 of a spot being struck harder than the other edge 103, to provide the wedge shaped cross section from which the commutator lugs 24 and 25 are afterwards cut. Offset 30 (see Fig. 40) is then made at the middle portion of each part 100 by bending, when these parts will be identical with those shown in Fig. 3, after which the procedure is identical with that described relative to Figs. 1 to 10 inclusive.

The great diversity of purposes for which dynamo electric machine armatures are made necessitates a wide range in the character of their windings and commutators, and while I have shown several forms in which my improved integral winding units may be made, still other and considerably modified forms of these units which may be forged, sand cast, die cast, or otherwise fabricated, by new or known methods of procedure may be employed to carry out the principles of this invention which consists not so much in the method whereby the loops are made as in the method of making an armature therefrom..

Having described my invention I claim—

1. The method of making an armature having an integral commutator and winding which consists of cutting a plurality of lengths of stock each suitable for a turn of the winding, forming each piece into a loop comprising a conductor bar of the outer layer, a conductor bar of the inner layer and two wedge shaped ends, each said end being suitably located and of sufficient axial length and radial width tho not of sufficient circumferential thickness to compose a commutator segment, assembling the loops in the core, forming a cylindrical ring by placing the ends of the loops circumferentially adjacent, pairs of ends in electrical contact being of sufficient thickness for commutator segments, and binding the members of each pair together to compose segments and the segments together to compose a commutator.

2. The method of making an armature which consists of providing a core having rectangular winding slots, providing rectangular wire of such size that two wires placed one radially above the other will substantially fill one said slot, cutting a plurality of lengths of said wire, each said length being sufficient to compose a turn of the winding, bending the lengths into loops of such form that each has a conductor bar adapted to occupy the outer half of a core slot and another conductor bar adapted to occupy the inner half of a core slot, striking the free ends of the conductors in a die to form wedge shaped lugs having longitudinal grooves in their sides, each said lug being suitably located and of sufficient axial length and radial width but of only half the circumferential thickness for a commutator segment, assembling the loops in the core slots with the free ends in circumferentially adjacent layers forming a cylindrical ring, holding pairs of said ends in electrical contact to compose commutator segments while holding said segments spaced apart, and molding insulating material between and around the conductor ends and into the said longitudinal grooves to compose segments of the said pairs and a commutator of the said segments.

3. The method of making an armature which consists of providing a plurality of loops, each integrally comprising a turn of the winding having half of a commutator segment at each end, assembling the loops in a core, placing the structure in a mold, applying pressure to the two halves of each segment to hold them together in electrical contact, holding said segments spaced apart one from another, and molding insulating material thru and about the structure to compose segments of the said halves and a commutator of the said segments.

In testimony whereof I hereunto sign my name.

VINCENT G. APPLE.